UNITED STATES PATENT OFFICE.

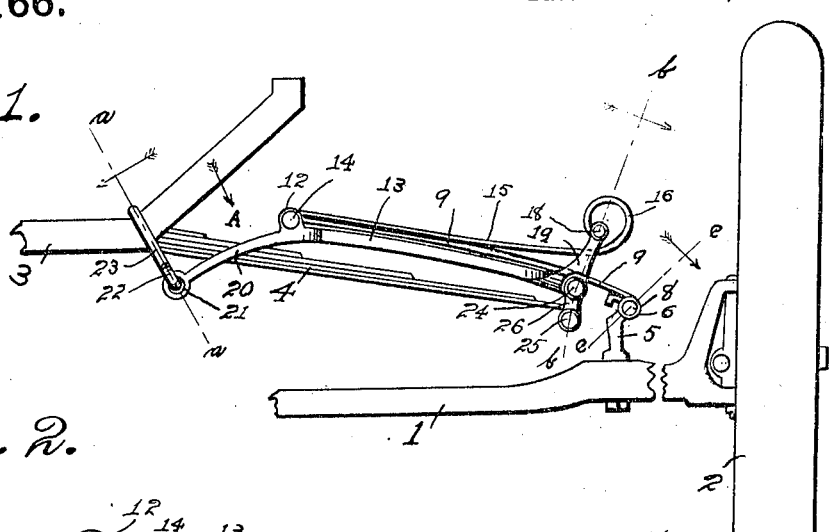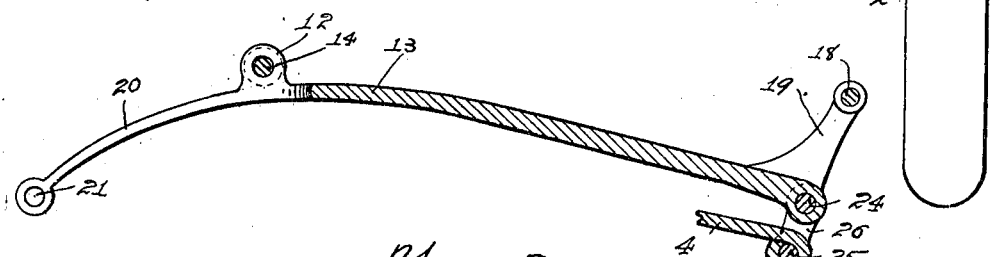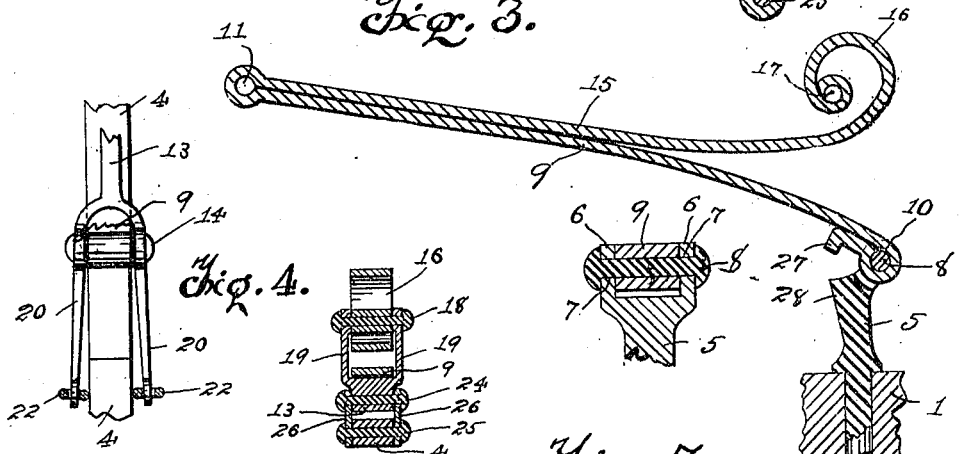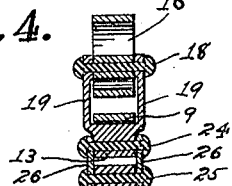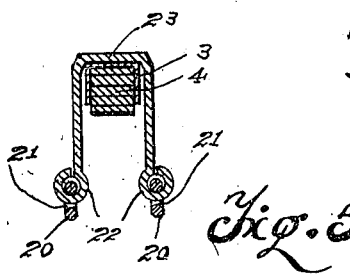

GEORGE F. VOIGHT, OF SAN FRANCISCO, CALIFORNIA.

SHOCK-ABSORBER.

1,292,166.   Specification of Letters Patent.   Patented Jan. 21, 1919.

Application filed May 27, 1918. Serial No. 236,877.

*To all whom it may concern:*

Be it known that I, GEORGE F. VOIGHT, a citizen of the United States, residing at San Francisco, in the county of San Francisco and State of California, have invented new and useful Improvements in Shock-Absorbers, of which the following is a specification.

My invention relates to a shock absorbing device adapted to be interposed between the regular leaf spring and the axle of an automobile or like road vehicle, and in which a principal oscillatory lever is pivotally supported at its outer end by the axle, and a second or complementing lever operating in conjunction with the former and pivotally connected thereto, which has one end supported by a portion of the vehicle and which is approximately vertically movable relatively to the axle and its other end resiliently yieldingly supported by said oscillatory lever and adapted to be connected to and supporting one end of the said regular leaf spring.

With the foregoing and other objects and purposes in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:

Figure 1 is a front-end elevation of a portion of the left-hand side of an automobile with my shock absorber applied thereto; Fig. 2 is a vertical section of the complementing lever and its connection with the regular leaf spring; Fig. 3 is a vertical section of the oscillatory lever and its supporting perch or bracket and a vertical sectional view of a fragment of the axle; Fig. 4 is a view in a direction indicated by the arrow A, Fig. 1 of a portion of the present invention, showing also a portion of the vehicle's regular leaf spring; Fig. 5 is a sectional view on line *a—a*, Fig. 1; Fig. 6 is a sectional view on line *b—b*, Fig. 1; and Fig. 7 is a sectional view of a portion of the invention on line *c—c*, Fig. 1.

While I have shown my invention as applied to the front left-hand side of a vehicle, it is to be understood that it is applicable to the right-hand side as well as to the left-hand side, and to the rear as well as to front of any vehicle.

Like numerals refer to like parts throughout the several views:

Referring to the drawings:

1 designates a vehicle axle supported at one end by a wheel 2, and 3 the vehicle's frame supported by a regular leaf spring 4.

To the upper side of the axle I rigidly secure a perch or bracket 5 provided at its free end with ears 6 6 having transverse openings 7 7 through which extends a pivot pin 8.

9 is a resiliently flexible leaf spring lever provided at its outer end with a transverse opening 10 for pivotally mounting it on the pin 8, and provided at its inner end with a transverse opening 11 for pivotally connecting it to the ears 12 12 projecting upwardly from an intermediate section of a complementing lever 13, by means of a pivot pin 14. The lever 9 is preferably bowed gently upwardly intermediate its ends, and is disposed above the outer end section of the spring 4 and extends in a general direction therewith.

15 is a leaf spring disposed above the oscillatory lever 9 and extends in a general direction therewith. The inner end of which being unitarily secured to the inner end of the lever, and is preferably, and as such shown in the drawings, a continuation of the latter doubled back upon itself after forming the opening 11 at the inner end thereof, and is adapted to be in bodily bearing engagement therewith for a greater or less distance. The outer section of the spring 15 is bowed upwardly from its intermediate section and disposed upwardly and apart from a registering section of the lever 9, and terminates in a resiliently flexible loop or scroll 16 having at its free end an opening 17 supporting a pivot pin 18. The free end section of the spring 15 and its loop 17 being movable downwardly against the tension of said spring and loop.

For the reason that the oscillatory lever 9 intermediate its ends supports the spring 15, it is obvious that when said spring is moved downwardly a proper distance, the former may be deflexed downwardly intermediate its ends relatively to the ends, against the tension of itself.

The outer end of the complementing lever 13 is bifurcated forming two upwardly extending arms 19 19 disposed one on each side of the lever 9, spring 15 and its loop 16. The upper or free ends of the arms 19 19 are supported by the free end of the loop 16 by means of the pin 18. The inner section of the complementing lever 13 is also bifurcated thereby forming two arms 20 20, adapted to straddle the leaf spring 4 from the upper side thereof, and provided at their free ends with openings 21 21 adapted to receive the lower ends 22 22 of an inverted stirrup 23 supported by the frame 3. If so desired, the stirrup 23, instead of being supported by the frame 3, may be supported in a similar manner, by the regular leaf spring 4 intermediate the ends of the latter.

To an outer section of the lever 13 is pivotally connected one end of the regular leaf spring 4 by means of pivot pins 24 and 25 and links 26 26 assembled in a well known manner.

In forming the opening 10 in the outer end of the lever 9, I bend the end of the lever downwardly thence looping it backwardly upon itself and thence inwardly and downwardly a suitable distance thereby forming a stop 27 adapted to operatively engage with a shoulder 28 on the perch 5 when the lever is rotated downwardly a certain distance upon the pin 8, to prevent the outer end of the leaf spring from operatively contacting with the axle 1.

From the foregoing description of my invention, and as it is shown by the drawings, it can be seen that the spring 15 and its loop 16, together with the lever 9, may resiliently yieldingly support one end of the regular leaf spring 4. The arms 22 22 and the shackle connection between the end of the spring 4 and the lever 13, forming intermediate means.

Throughout the foregoing specification, and in the claims hereinafter following, to facilitate designating the relative positions of the different portions, sections and parts forming the present invention, in connection with the vehicle, the term, outer end, or, outer ends, shall designate the end or ends nearest to the vehicle wheel, and the term, inner end, or, inner ends, shall designate the end or ends farthest away from the wheel.

The oscillatory lever 9, spring 15 and the complementing lever 13, may from time to time be referred to as the lever-assembly.

I claim:

1. In combination with the frame, axle and regular leaf spring of a vehicle, a shock absorber comprising an oscillatory lever, a pivotal connection between the outer end of the lever and the axle, a complementing lever, a connection between the inner end of the complementing lever and a support movable relatively to the axle, a connection between the levers, and a connection between one of the levers and one end of the regular leaf spring.

2. In combination with the frame, axle and regular leaf spring of a vehicle, a shock absorber comprising an oscillatory lever, a pivotal connection between the outer end of the lever and the axle, a complementing lever, a connection between the inner end of lever, a connection between the inner end of the complementing lever and a support movable relatively to the axle, a pivotal connection between the complementing lever intermediate its ends and the oscillatory lever, and a connection between the complementing lever adjacent its outer end and one end of the regular leaf spring.

3. In combination with the frame, axle and regular leaf spring of a vehicle, a shock absorber embodying an oscillatory lever, a pivotal connection between the outer end of the lever and the axle, a complementing lever, a connection between the inner end of the complementing lever and a support movable relatively to the axle, a pivotal connection between the inner end of the oscillatory lever and the complementing lever intermediate the ends of the latter, a resilient connection between the complementing lever adjacent its outer end and the oscillatory lever, and a connection between the complementing lever and one end of the regular leaf spring.

4. In combination with the frame, axle and regular leaf spring of a vehicle, a shock absorber comprising an oscillatory lever, a pivotal connection between the outer end of said lever and the axle, a complementing lever, a connection between the inner end of the complementing lever and a support vertically movable relatively to the axle, a pivotal connection between a section of the complementing lever and a section of the oscillatory lever, a resilient connection between another section of the levers, and a connection between one of the levers and one end of the regular leaf spring.

5. In combination with the frame, axle and regular leaf spring of a vehicle, a shock absorber comprising an oscillatory lever, a pivotal connection between the outer end of said lever and the axle, a complementing lever, a connection between the inner end of lever, a connection between the inner end of the complementing lever and a support movable relatively to the axle, a pivotal connection between one section of the levers, a spring supported by the oscillatory lever, a connection between said spring and the complementing lever adjacent its outer end, and a pivotal connection between one end of the regular leaf spring and the complementing lever.

6. In combination with the frame, axle and regular leaf spring of a vehicle, a shock absorber comprising an oscillatory lever, a pivotal connection between the outer end of the lever and the axle, a spring supported by said lever intermediate its ends, a complementing lever having its outer end resiliently supported by the last mentioned spring, a connection between the inner end of the complementing lever and a support movable relatively to the axle, a pivotal connection between the levers, and a pivotal connection between one of the levers and one end of the regular leaf spring.

7. In a shock absorber, an oscillatory lever, a pivotal connection betwen the outer end of the lever and the axle of the vehicle, a spring carried by the lever intermediate its ends, a complementing lever having its outer end resiliently supported by said spring, a support for its inner end vertically movable relatively to the axle, and a pivotal connection between the inner end of the oscillatory lever and the complementing lever intermediate the ends of the latter, the complementing lever being adapted to yieldingly support one end of the vehicle's regular leaf spring.

8. The combination with the frame, axle and regular leaf spring of a road vehicle, of an oscillatory lever pivoted at its outer end to the axle, a complementing lever having its inner end movably supported relatively to said axle, a non-resilient connection between one section of said levers, a resilient connection between another section of said levers, and a connection between one of said levers and one end of the regular leaf spring.

9. The combination with the frame, axle and regular leaf spring of an automobile, of an oscillatory lever pivotally supported at its outer end by the axle, a complementing lever having its inner end supported by a portion of the automobile subject to rebound, a pivotal connection between one section of said levers, a resilient connection between another section of said levers, and a link connection between one of said levers and one end of the regular leaf spring.

10. The combination with the frame, axle and regular leaf spring of an automobile, of an oscillatory lever having its outer end pivoted to the axle, a complementing lever having its inner end flexibly coupled to a portion of the automobile movable relatively to the axle, a pivotal connection between the inner end of said oscillatory lever and said complementing lever intermediate its ends, a resilient connection between the outer end of said complementing lever and said oscillatory lever intermediate its ends, and a connection between said complementing lever and one end of the regular leaf spring.

11. The combination with the frame, axle and regular leaf spring of an automobile, of an oscillatory lever having its outer end pivoted to the axle, a complementing lever having its inner end supported by a portion of the automobile movable relatively to the axle, a connection between said complementing lever intermediate its ends and the free end of said oscillatory lever, a spring supported by said oscillatory lever intermediate its ends, a connection between said last named spring and the outer end of said complementing lever, and a connection between said complementing lever adjacent its outer end and one end of the regular leaf spring.

12. In a shock absorber of the character described, the combination with an oscillatory lever pivoted at its outer end to the automobile's axle, of a complementing lever having its inner end bifurcated and adapted to straddle an intermediate section of the automobile's regular leaf spring, a connection between the free ends of the arms forming said bifurcated section and a portion of the automobile movable relatively to said axle, a pivotal connection between a section of said levers, a resilient connection between another section of said levers, and a link connection between one of said levers and one end of said regular leaf spring.

13. The combination with the frame, axle and regular leaf spring of an automobile, of a bracket rigidly secured to the axle and having a section projecting upwardly therefrom, an oscillatory lever having its outer end pivotally connected to the upper end of said bracket, a complementing lever having its inner end supported by a portion of the automobile movable relatively to the axle, the inner end of said oscillatory lever being supported by said complementing lever intermediate its ends, the outer end of said complementing lever being supported by said oscillatory lever intermediate its ends, and a link connection between said complementing lever adjacent its outer end and one end of said regular leaf spring.

14. In a shock absorber of the character described, the combination with an oscillatory lever arranged to be pivoted at its outer end to an automobile axle and having its inner end movably supported relatively thereto, of a leaf spring disposed above said lever and extending in a general direction therewith, the inner ends of said lever and spring being disposed in close relation with each other and connected together, sections of said lever and spring intermediate their ends being in bodily engagement with each other, the outer end of said spring being spaced upwardly and apart from said lever, and a link connection between said spring adjacent its outer end and one end of the automobile's regular leaf spring, the arrangements being such that said first named spring may yieldingly support said one end of said regular leaf spring.

15. In a shock absorber of the character described, the combination with the frame, axle and regular leaf spring of an automobile, of a pair of leaf spring levers disposed one above the other and having their inner ends connected together, a common connection between said inner ends and a portion of the automobile movable relatively to the axle, the outer end of the lower lever being pivoted to the axle, the outer end of the upper lever being spaced apart from a registering section of the lower lever, and a connection between said free end of the upper lever and one end of the principal leaf spring.

16. In a shock absorber of the character described, the combination with a vehicle axle and leaf spring, of a pair of leaf spring levers joined together adjacent their inner ends and having their outer ends spaced apart, a pivotal connection between the free end of one of said levers and the axle, a link connection between the free end of the other lever and one end of the leaf spring, and a connection between the levers adjacent their inner ends and a portion of the vehicle movable relatively to said axle.

17. The combination with the frame, axle and regular leaf spring of an automobile, of a lever pivoted at its outer end to the axle, a relatively movable support for its inner end, a resiliently flexible lever disposed above said first named lever and extending in a general direction therewith, a substantially rigid connection between the levers adjacent their inner ends, the outer end of said flexible lever terminating in a backwardly turned scroll, and a connection between the free end of said scroll and one end of the regular leaf spring.

18. The combination with the axle, frame and regular leaf spring of an automobile, of an oscillatory leaf spring lever pivoted at its outer end to the axle and having a relatively movable support for its inner end, a flexible leaf spring disposed above said lever and supported thereby, one end of said flexible leaf spring being rigidly secured to said lever, the other end of said last named spring terminating in a scroll, the axis of said scroll being disposed transversely relatively to said lever, and a connection between the free end of said scroll and one end of the regular leaf spring.

In evidence of the foregoing being my own, I have hereunto signed may name.

GEORGE F. VOIGHT.